United States Patent
Wigren et al.

(10) Patent No.: US 8,280,394 B2
(45) Date of Patent: Oct. 2, 2012

(54) OFDMA UPLINK INTERFACE IMPACT RECOVERY IN LTE SYSTEM

(75) Inventors: Torbjorn Wigren, Uppsala (SE); Bo Goransson, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 215 days.

(21) Appl. No.: 12/671,931

(22) PCT Filed: Jun. 27, 2008

(86) PCT No.: PCT/EP2008/058266
§ 371 (c)(1),
(2), (4) Date: Feb. 3, 2010

(87) PCT Pub. No.: WO2009/019074
PCT Pub. Date: Feb. 12, 2009

(65) Prior Publication Data
US 2011/0237273 A1   Sep. 29, 2011

(30) Foreign Application Priority Data
Aug. 6, 2007   (SE) ...................... 0701825

(51) Int. Cl.
*H04W 72/08* (2009.01)
(52) U.S. Cl. .................. 455/452.2; 455/522; 455/562.1; 370/277
(58) Field of Classification Search .......... 455/423, 455/67.11, 57.13, 69, 450, 509, 452, 522, 455/562; 370/320, 328–338, 395, 277
See application file for complete search history.

(56) References Cited

U.S. PATENT DOCUMENTS
7,035,661 B1 * 4/2006 Yun ........................ 455/522
2007/0249361 A1 * 10/2007 Klang et al. ............... 455/452.2

FOREIGN PATENT DOCUMENTS
EP      1589776 A1   10/2005
WO      02/49305 A2   6/2002
WO      2007/055626 A1   5/2007

OTHER PUBLICATIONS

Hosein, P. "Interference Management of OFDMA Uplinks." IEEE 65th Vehicular Technology Conference, 2007 (VTC2007-Spring), Dublin, Ireland, Apr. 22-25, 2007, pp. 2435-2439.

* cited by examiner

*Primary Examiner* — Kamran Afshar
*Assistant Examiner* — Kashif Siddiqui
(74) *Attorney, Agent, or Firm* — Coats & Bennett, P.L.L.C.

(57) ABSTRACT

The present invention relates to methods and arrangements to estimate neighbor cell interference for admission control purposes. Information on at least the total estimated neighbor cell interference power and the own cell power for frequency subsets of tones ft is signalled to neighboring cells for calculating a vector of impact values describing the interference impact of transmissions in a first impacting cell on respective impacted neighbor cells. The neighbor cell interference impact caused by a resource allocation in a first cell is estimated by help of the pre-calculated impact values such that resources are allocated to cause a minimized interference impact on said neighboring cells.

11 Claims, 3 Drawing Sheets

OFDMA UPLINK INTERFACE IMPACT RECOVERY IN LTE SYSTEM

TECHNICAL FIELD

The present invention relates to a method and an arrangement in a communication network and more specifically to own cell interference impact recovery in the uplink of an Evolved Universal Terrestrial Radio Access Network (E-UTRAN), sometimes also denotes as Long Term Evolution (LTE) system.

BACKGROUND

The uplink in a cellular radio access network of an E-UTRA is a combination of single-carrier TDMA and Frequency Division Multiple Access (FDMA) with dynamic scheduling, which allows for an orthogonal uplink transmission, thereby avoiding all intra-cell interference. However, transmissions between cells are non-orthogonal as a consequence of single frequency reuse. Thus, the traffic in each cell will contribute to an interference that impacts its neighbouring cells.

Scheduling of user equipments in a cell (i.e. inform user equipments (UEs) when and on what part of bandwidth they are allowed to transmit) and admission of new user equipments to a cell are two of the most basic tasks to be performed in a cell.

Scheduling in E-UTRAN: Scheduling of time and frequency resources among user equipments for uplink communication is complicated by the fact that the scheduler, which is located in the base station, is not automatically aware of the resource demand of the users. This includes, e.g., the type and amount of data that a user intends to transmit but also depends on which users intend to transmit data. The concept for uplink scheduling is based on a resource reservation principle where the user equipment requests permission to transmit data. The UL scheduler monitors the requests of the user equipments and distributes the available resources among the various data flows. Further, the scheduler informs user equipments of the scheduling decision by issuing a resource assignment (or grant) for the transmission. Thus, uplink transmission is scheduled by a scheduling mechanism in the radio base station (i.e. the eNodeB in E-UTRAN) whereby scheduling grants inform the user equipments (UEs) when and at what part of the bandwidth they are allowed to transmit. FIG. 1 illustrates the concept of uplink scheduling.

Scheduling grants are transmitted to the user equipments using the downlink shared control channel. A scheduling grant includes information on the user ID and the resources that are to be used for uplink data transmission (e.g. location in frequency domain, (recommended) modulation scheme, antenna configuration, etc.) The grant may address a specific radio bearer (or logical channel) rather than only a specific UE. This enables the scheduler to enforce priorities between flows from single user equipments. In its simplest form the scheduling grant is valid only for the next UL TTI. However, in order to reduce the amount of required control signalling, persistent scheduling (i.e. the network signals a "scheduling pattern" to the user equipment) may be considered.

Admission control in E-UTRAN: Decisions to admit new users to a cell must consider the interference impact of such a new user on neighbouring cells (as already explained above) and within the own cell as well as the impact from said neighbouring cells. It is preferable to allocate new traffic to frequencies with low interference from neighbour cells. This ensures that the interference level for the new traffic will be low, at the same time as only a small amount of traffic in neighbour cells is likely to be negatively affected by the interference generated by the new scheduled traffic.

On top of eNodeB scheduling, the admission of users needs to be supervised and controlled at a higher level. This is done by the admission control function.

When a user equipment transmits on a subset of tones in the uplink of an E-UTRAN, the corresponding tones of the uplinks of neighbour cells are affected by a corresponding interference. It is hence less beneficial to schedule traffic in neighbour cells to these tones. Furthermore, in case the interference level increases above acceptable thresholds for certain sets of tones in terms of bandwidth, the admission control function preferably does not allow any further user equipments to use these tones.

As a consequence, neighbour cell interference is preferably accounted for when the admission decisions are taken. In order to determine the neighbour cell interference in a specific frequency band, the thermal noise power and the own cell power in said frequency band needs to be measured or estimated, and subtracted from the measured total signal power in said frequency band.

Noting that the interference from cells affects all surrounding cells, the impact of one specific cell on another specific neighbour cell cannot be obtained by only estimating the total perceived neighbour cell interference level. It is thus not possible to perform optimal scheduling and admission control decisions accounting for inter-cell effects.

International patent applications WO 2007/024166 and WO 2008/004924 disclose soft estimation of neighbour cell interference exploiting techniques for soft noise floor estimation applicable for UTRAN. Given the availability of algorithms for estimation of the conditional probability distribution of the thermal noise power floor for the complete uplink frequency band, said documents disclose soft estimation of the discretized conditional probability distribution of the thermal noise power floor of individual tones of the uplink. Further, given measurements of the total uplink power and the own cell uplink power of the tones, said documents disclose algorithms and means for estimation of the discretized conditional probability distribution of the neighbour cell interference, for each tone or subset of tones. The optimal estimate of the neighbour cell interference, as perceived in the cell, together with the corresponding optimal estimate of the variance, may then be computed as conditional means as described in prior art.

Prior art thus discloses means that estimate the perceived neighbour cell interference from other close cells.

SUMMARY

For scheduling and admission control of radio communication in cells of a radio access network it is crucial to have information on consequences of such scheduling and control measures not only for the total power in the own cell but also, in particular in frequency reuse-1 systems, for the total power in the neighbouring cells.

Thus, the present invention generally relates to problems of inadequate scheduling and admission control in radio access networks due to the interference that cells generate in their respective neighbour cells. More particularly, power control mechanisms for cells in E-UTRAN consider power impacts generated by radio transmissions in their own cell and from interfering neighbour cells but cannot consider the power impacts of radio transmissions in their own cell on their neighbour cells.

It is thus an object of the present invention to achieve in the cells of a radio access network methods and arrangements for supporting an efficient scheduling and admission control by terms of minimising the consequences of said control measures on the interference in neighbouring cells.

When estimating the perceived cell interference caused by a given cell on its neighbouring cells it is desirable to know the impact of the interference caused by uplink transmissions in said cell on a per-cell basis, i.e. the individual impact of the interference on each neighbour cell.

It is therefore an further object of the present invention to achieve a method and arrangement for estimating and signalling required information between eNodeBs to achieve information of said neighbour cell interference impact.

It is the basic idea of the present invention to use available estimates of the total neighbour cell interference power for a given cell within an estimation cluster for determining the interference impact of said given cell on its neighbour cells within said cluster.

This is achieved by means of combining said estimates (and their corresponding variances) from all cells in said estimation cluster for transformation into a matrix of estimated impact values for the cells in said estimation cluster. The impact values describe for each of a subset of tones the impact of the cell power of a given (impacting) cell on the interference power in the other (impacted) cells of the estimation cluster to be used for model of the power impact of a given cell on its neighbour cells.

According to one aspect, embodiments of the present invention comprise methods and arrangements for signalling of one or several of the estimated interference powers, corresponding variances, noise floor, and cell IDs. Such properties can be signalled either between all other cells (i.e. base transceiver stations) of a measurement cluster or to a central estimation node.

According to a second aspect, embodiments of the present invention comprise methods and arrangements for transforming estimated neighbour cell interference powers to estimated impact factors; said impact factors describing the interference power impact in each cell of the measurement cluster depending on the own signal power in a sub-set of tones in the own cell. The estimation step computes for each received set of neighbour cell interference information the neighbour cell interference impact of traffic in one cell on each of the other cells of the estimation cluster. This estimation step can be performed in number of ways, as described in the detailed description.

Cells in the context of the present description are understood as the coverage area for one or several user equipments served by a transceiver unit.

Embodiments of the present invention relate to estimations of neighbour cell interference and transformations between estimated neighbour cell interference power and an impact factor. The provided information can be applied, inter alia, for scheduling of traffic in the eNodeB and/or for admission control functionality in the communication system.

It is thus an advantage of the present invention to allow improved admission control and scheduling of user equipments in a cell due to the improved knowledge of the neighbour cell interference impact of uplink transmission in said neighbouring cell.

Still other objects and features of the present invention will become apparent from the following detailed description considered in conjunction with the accompanying claims and drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

The present invention relates to an algorithm that uses estimated neighbour cell interference values in the uplink of a set of LTE cells, together with corresponding variances, as input values. These values are assumed to be available for a number of known sub-sets of tones of the LTE uplink, for a consecutive sequence of Transmission Time Intervals (TTI) or, possibly, for each TTI. The latter case is likely to be a pre-requisite in case embodiments of the present invention shall be applied for scheduling purposes.

The decision on grant for resource scheduling, and also allocation of frequency bands for the UE transmission, would benefit from knowledge of the interference in all available frequency bands. This follows since it is preferable to allocate new traffic to frequencies with low interference from neighbour cells. This ensures that the interference level for the new traffic will be low, at the same time as only a small amount of traffic in neighbour cells is likely to negatively affected by the interference generated by the new scheduled traffic. It can hence be concluded that it is essential to be able to estimate the interference for each frequency band of the uplink channel of the LTE cellular system.

The decision to admit new users would also benefit from knowledge of the neighbour cell interference impact of one specific cell on all other surrounding cells which are close enough to be affected of the interfering cell, in all available frequency sub bands (tones). This follows since it is preferable to allocate new traffic to frequencies with low interference from neighbour cells. This ensures that the interference level for the new traffic will be low, at the same time as only a small amount of traffic in neighbour cells is likely to be negatively affected by the interference generated by the new scheduled traffic. It can hence be concluded that it is essential to be able to estimate the interference impact of a specific cell, on neighbour cells for each tone or group of tones of the uplink channel of the LTE cellular system.

Figure 1:
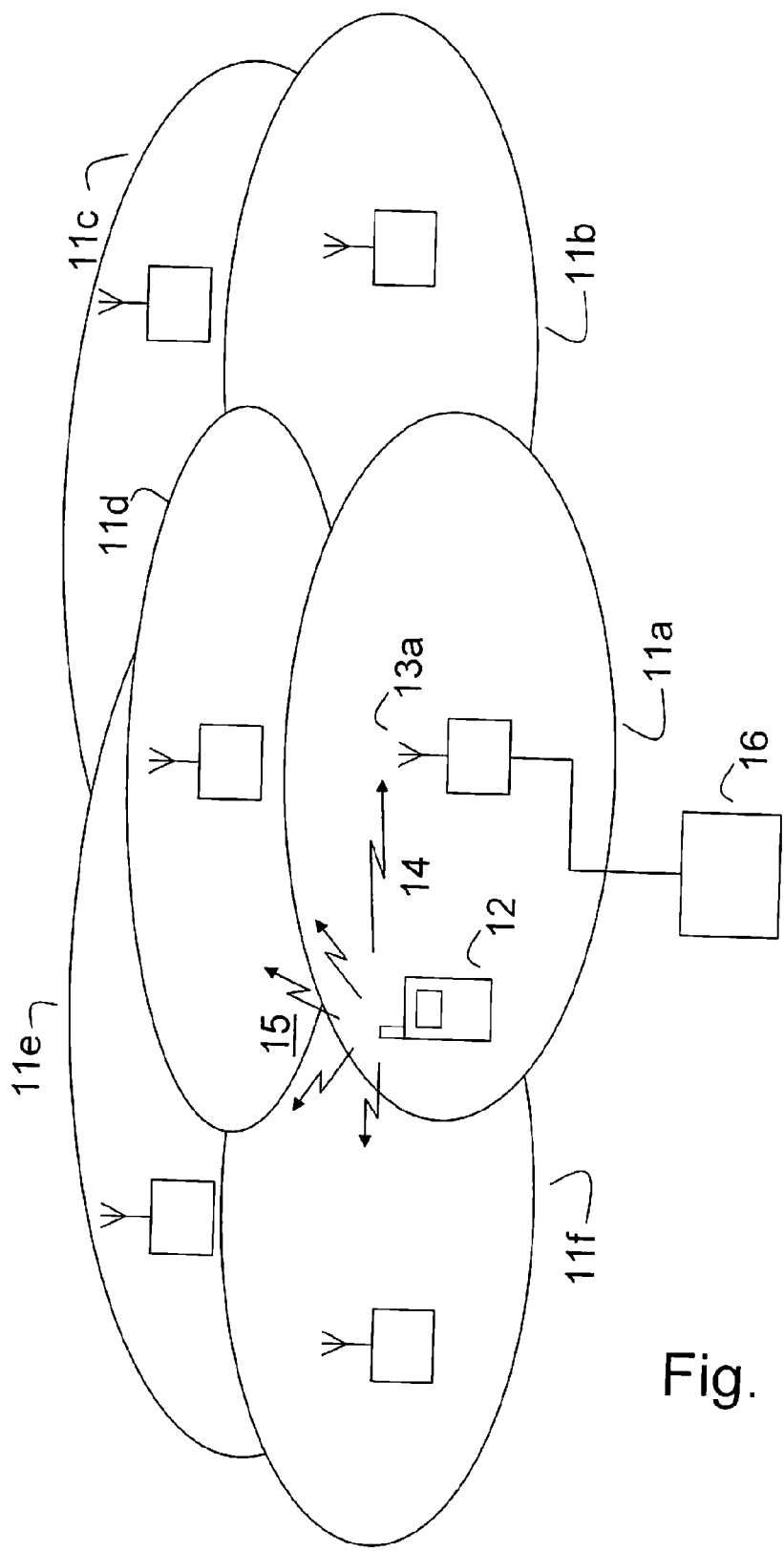
FIG. 1 illustrates a part of a cellular communication system consisting of an estimation cluster of cells for which the present invention can be applied.
Figure 2:
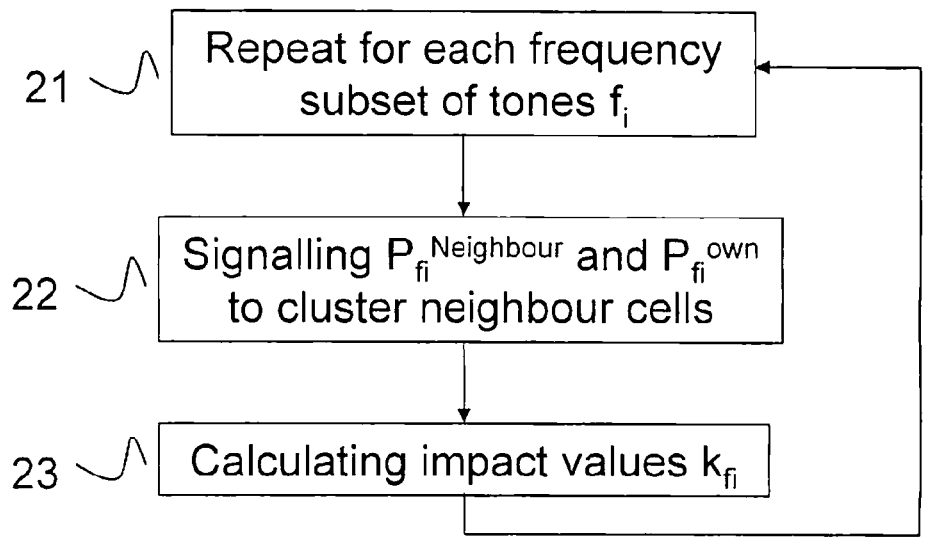
FIG. 2 illustrates a flowchart for performing a method for determining a vector of impact values describing the interference impact of transmissions in a first cell on its neighbouring cells.

FIG. 1 illustrates a part of a cellular communication system including a plurality of cells whereof a certain number of neighboured cells 11a-11f is, within the scope of the present invention, seen as an estimation cluster 10. The present invention addresses problems resulting from the interference impact caused by an uplink transmission 14 of a user equipment (UE) 12 within a cell 11a (for reasons of distinction also denoted as first cell) to the base transceiver station 13a (i.e. a radio base station or transceiver unit covering a certain area) serving said first cell 11a. Said interference impact constitutes interfering power contributions 15 in the respective frequency bands of the neighbouring cells 11b-11f. The unit that performs the method steps according to embodiments of the present invention can be an integrated part of the base transceiver station 13a or, alternatively, located in an external unit 16.

The detailed description discloses estimation techniques and signalling means that recovers the individual cell-to-cell interference impact for the uplink of the LTE communication system.

Signalling of perceived neighbour cell information: In order to describe the signalled information, the following notation for the respective frequency sub-set i is applied (i=1, ..., I; I denoting the total number of subsets)

$f_i$ denotes the tones of frequency sub-set i,
$P_{f_i}^{Total}$ denotes the total estimated power,
$P_{f_i}^{Own}$ denotes the total estimated own cell power,
$P_{f_i}^{Neighbour}$ denotes the total estimated neighbour cell interference power,
$P_{f_i}^{SelfInterference}$ denotes the total estimated self interference power,
$N_{f_i}$ denotes the thermal noise power floor.

The relation of the total estimated power, $P_{f_i}^{Total}$, the total estimated own cell power, $P_{f_i}^{Own}$, the total estimated neighbour cell interference power, $P_{f_i}^{Neighbour}$, and the thermal noise power floor all in a frequency sub-set i, can be described as $P_{f_i}^{Total}(t) = N_{f_i}(t) + P_{f_i}^{Own}(t) + P_{f_i}^{Neighbour}(t)$.

The actually signalled quantities, from each cell, consist of optimal estimates and, possibly, corresponding variances of the above quantities. Estimates are denoted by $\hat{x}$ where x is the quantity of interest, and variances by $\hat{\sigma}_x^2$. Quantities that are considered to be of particular interest include the thermal noise floor $N_{f_i}$ and the total estimated neighbour cell power $P_{f_i}^{Neighbour}$. The following shows, by means of examples not excluding other combinations of quantities, combinations of implicit or explicit quantities that can be of interest within the scope of the present invention:

$\hat{N}_{f_i}, \hat{P}_{f_i}^{Neighbour}, \hat{P}_{f_i}^{Own}, \hat{\sigma}_{P_{f_i}^{Neighbour}}^2 \hat{\sigma}_{P_{f_i}^{Own}}^2$, cellID
$\hat{N}_{f_i}, \hat{P}_{f_i}^{Neighbour}, \hat{P}_{f_i}^{Own}$, cellID
$\hat{N}_{f_i}, \hat{P}_{f_i}^{Neighbour}/\hat{N}_{f_i}, \hat{P}_{f_i}^{Own}/\hat{N}_{f_i}, \hat{\sigma}_{P_{f_i}^{Neighbour}}^2/\hat{N}_{f_i}^2, \hat{\sigma}_{P_{f_i}^{Own}}^2/\hat{N}_{f_i}^2$, cellID
$\hat{N}_{f_i}, \hat{P}_{f_i}^{Neighbour}/\hat{N}_{f_i}, \hat{P}_{f_i}^{Own}/\hat{N}_{f_i}$, cellID.

As a non-limiting example, in E-UTRAN any of the above (or other) quantities can be signalled to the central access gateway (AGW) or any other control node, e.g., over the S1 interface for purposes of admission control. For purposes of scheduling and/or admission control, any of the above (or other) quantities can be signalled to all other eNodeBs in the estimation cluster, e.g., over the X2 interface.

Estimation of the Neighbour Cell Interference Impact

In order to relate the perceived estimated neighbour cell interference powers of cells to the impact of a particular cell to the other cells, the present invention introduces a set of impact values $k_{f_i,lm}$ describing an estimation of neighbour cell interference impacts. A first index of said impact values denotes the frequency sub-set $f_i$ for which the impact is considered as said values differ for the various frequency sub-sets. A second set of indices lm denotes the cells for which the impact factor is considered, where l (l=1, ..., C) denotes the impacting cell l (l=1, ..., C) and m (m=1, ..., C, m≠l) denotes the impacted cell. C is the total number of cells in the estimation cluster. Impact values need thus to be determined individually for each cell (as impacting cell) of the estimation cluster. The impact factors can be interpreted as an average uplink pathloss from terminal(s) operating in the frequency band $f_i$ in the cell l to the uplink receiver in cell m. In case only one terminal is allocated to a frequency band, then the impact factor refers to that terminal alone. The sum denoted in equation (1), hence, is the sum from all terminals in cells close to cell m leading to the impact equation $$\hat{P}_{f_i,m}^{Neighbour}(t) = \sum_{\substack{l=1 \\ l \neq m}}^{C} k_{f_i,lm} P_{f_i,l}^{Own}(t) + e_{f_i,m}^{Neighbour}(t) \quad (1)$$

$$m = 1, \ldots, C, i = 1, \ldots, I$$

and the equation $$r_{2,f_i,m}(t) = E\left[e_{f_i,m}^{Neighbour}(t)\right]^2 = \hat{\sigma}_{P_{f_i,m}^{Neighbour}}^2(t) \quad (2)$$

$$m = 1, \ldots, C, i = 1, \ldots, I$$

denoting the mathematical formulation of the assumption that the disturbance $e_{f_i,m}^{Neighbour}(t)$ is zero mean Gaussian. In equation (2) $r_{2,f_i,m}(t)$ denotes the formal error covariance, E[ ] denotes statistical expectation, $e_{f_i}^{Neighbour}(t)$ denotes the estimation error, whereas $$\hat{\sigma}_{P_{f_i,m}^{Neighbour}}^2(t)$$

denotes the measurement variance.

The notation assumes, without intend to restrict for generalisations, that frequency sub-bands are equal between the eNodeBs. Also, the number of equations increases linearly with C while the number of unknowns increases quadratically. Hence, it will be necessary to combine measurements from several TTIs when estimating the impact factors $k_{f_i,lm}$.

Equations (1) and (2) define measurement equations. As will be seen, these can be cast in a generalized linear regression form. To generalize the concept, dynamic models for the evolution of the impact factors can be introduced in order to allow a Kalman filter to be applied. Using a random walk assumption, the model is $$k_{i,ml}(t+1) = k_{i,ml}(t) + w_{i,ml}(t), i=1, \ldots, I, l=1, \ldots, C, m \neq l \quad (3)$$

$$E[w_{f_i,ml}]^2 = r_{1,i,ml}, i=1, \ldots, I, l=1, \ldots, C, m=1, \ldots, C, m \neq l. \quad (4)$$

The difference equation (3) is a so called random walk model (cf. T. Söderström, *Discrete-Time Stochastic Systems-Estimation and Control*. Hemel Hempstead, UK: Prentice Hall, 1994.), which is commonly used in estimation to model parameters that are allowed to drift slowly. The quantities $w_{i,ml}(t)$ are denoted the systems noise. As expressed by equation (4) they are assumed to be zero mean Gaussian random variables. The quantities are denoted the systems noise covariances.

Without restricting the general idea of the present invention, the following describes by means of example three embodiments of the present invention for calculating an impact vector $k_{f_i} = k_{f_i,ll} \ldots k_{f_i,CC})^T$, which can according to a further embodiment of the present invention be used for estimating the neighbour cell interference impact.

Generally, after having signalled 22 information on at least the total estimated neighbour cell interference power $P_{f_i}^{Neighbour}$ and the own cell power $P_{f_i}^{Own}$ for frequency subsets of tones $f_i$ 21 to neighbouring cells in the estimation cluster described above, the impact values of said impact vector $k_{f_i}$ are calculated 23 for each frequency subset of tones $f_i$ 21 from at least a regression vector comprising received values of the own cell powers $P_{f_i}^{Own}$ of neighbouring cells in said cluster and from received values of said estimated neighbour cell interference power $P_{f_i}^{Neighbour}$, whereby each impact value describes the interference impact of transmissions in said first cell on a respective other cell in said cluster.

A first embodiment of the present invention does not make use of uncertainty information for a static estimation case. In this embodiment, equations (2), (3), and (4) are not exploited but, instead, a least squares solution is applied to derive the impact factors. This can be illustrated when considering estimates of the neighbour cell interference in the measurement cluster from the TTIs t=1 ..., N. Then, for the i:th subset of tones and for an estimation cluster containing C cells (as described above), the following linear regression model can be set up from equation (1) where m (m=1 ..., C) denotes the impacted cell:

$$\hat{P}_{f_i,1}^{Neighbour}(1) = \phi_1^T(P_{f_i,1}^{Own}(1), \ldots, P_{f_i,C}^{Own}(1))k_{f_i} + e_{f_i,1}^{Neighbour}(1)$$

M $$\hat{P}_{f_i,m}^{Neighbour}(1) = \phi_m^T(P_{f_i,m}^{Own}(1), \ldots, P_{f_i,C}^{Own}(1))k_{f_i} + e_{f_i,m}^{Neighbour}(1)$$

M $$\hat{P}_{f_i,C}^{Neighbour}(1) = \phi_C^T(P_{f_i,1}^{Own}(1), \ldots, P_{f_i,C}^{Own}(1))k_{f_i} + e_{f_i,C}^{Neighbour}(1)$$

M $$\hat{P}_{f_i,1}^{Neighbour}(N) = \phi_1^T(P_{f_i,C}^{Own}(N), \ldots, P_{f_i,C}^{Own}(N))k_{f_i} + e_{f_i,1}^{Neighbour}(N)$$

M $$\hat{P}_{f_i,m}^{Neighbour}(N) = \phi_m^T(P_{f_i,C}^{Own}(N), \ldots, P_{f_i,C}^{Own}(N))k_{f_i} + e_{f_i,m}^{Neighbour}(N)$$

M $$\hat{P}_{f_i,C}^{Neighbour}(N) = \phi_C^T(P_{f_i,1}^{Own}(N), \ldots, P_{f_i,C}^{Own}(N))k_{f_i} + e_{f_i,C}^{Neighbour}(N) \quad (5)$$

$\phi_m^T$ contains the relevant own cell powers for the particular impact at the appropriate location of the vector and the impact factor vector $k_{f_i} = (k_{f_i,11} \, k_{f_i,CC})^T$ contains all impact factors of the estimation cluster. The details of the ordering of components in the equation system (5) can be performed in a very large number of ways. It should be noted in particular that the regression vector $\phi_m^T$ does not depend on the own cell power for the cell for which the neighbour cell interference is estimated.

Next, the measurement equations of (5) are stacked as $$\hat{P}_{f_i}^{Neighbour} = \begin{pmatrix} \hat{P}_{f_i,1}^{Neighbour}(1) \\ M \\ \hat{P}_{f_i,C}^{Neighbour}(N) \end{pmatrix} \quad (6)$$

$$\Phi_{f_i} = \begin{pmatrix} \varphi_1^T(P_{f_i,1}^{Own}(1), \ldots, P_{f_i,C}^{Own}(1)) \\ M \\ \varphi_C^T(P_{f_i,1}^{Own}(N), \ldots, P_{f_i,C}^{Own}(N)) \end{pmatrix}. \quad (7)$$

This results, using equation (5), in the linear regression model $$\hat{P}_{f_i}^{Neighbour} = \Phi_{f_i} k_{f_i}. \quad (8)$$

It is well known that the solution to the corresponding linear least squares problem is $$\hat{k}_{f_i} = (\Phi_{f_i}^T \Phi_{f_i})^{-1} \Phi_{f_i}^T P_{f_i}^{Neighbour}. \quad (9)$$

The so obtained estimated impact factors are then ready to be used for prediction of the power impact, using equation (1) without the disturbance term.

A second embodiment of the present invention makes use of the uncertainty information for a static estimation case. In this embodiment, equations (3) and (4) are not exploited and a so called best linear unbiased estimate (BLUE) results. This solution implies the advantage that the uncertainty (i.e. variance) is used to weight the measurements.

Towards this end, consider estimates of neighbour cell interference from t=1 ..., N starting with the linear regression model (5) augmented with uncertainty information, i.e. with $$R = E\left[\begin{pmatrix} e_{f_i,1}^{Neighbour}(1) \\ M \\ e_{f_i,C}^{Neighbour}(N) \end{pmatrix} \begin{pmatrix} e_{f_i,1}^{Neighbour}(1) & \ldots & e_{f_i,C}^{Neighbour}(N) \end{pmatrix}\right]. \quad (10)$$

The stacking order is the same as for (6) and (7) in (10). It can then be proved that the optimal estimate of the impact factors is $$\hat{k}_{f_i} = (\Phi_{f_i}^T R^{-1} \Phi_{f_i})^{-1} \Phi_{f_i}^T R^{-1} P_{f_i}^{Neighbour}. \quad (11)$$

A diagonal version results, at no extra cost, by computation of the conditional variance of the estimated one-dimensional conditional probability distribution of the neighbour cell interference. Using that information leads to $$R = \begin{pmatrix} \hat{\sigma}^2_{P_{f_i,1}^{Neighbour}(1)} & 0 \\ 0 & \hat{\sigma}^2_{P_{f_i,C}^{Neighbour}(N)} \end{pmatrix}. \quad (12)$$

A third embodiment of the present invention makes use of the uncertainty information in a continuous estimation case: In this embodiment, equations (3) and (4) are exploited to obtain a Kalman filter formulation, resulting in a recursive update of the impact factor vector $k_{f_i} = (k_{f_i,11} \, k_{f_i,CC})^T$. The following state model results from (3) and (4)

$$k_{f_i}(t+1) = I k_{f_i}(t) + w_{f_i}(t) \quad (13)$$

$$R_1 = E[w_{f_i} w_{f_i}^T] = \begin{pmatrix} O & & 0 \\ & r_{1,i,ml} & \\ 0 & & O \end{pmatrix}, \quad (14)$$

where the stacking order of $w_{f_i}$ corresponds to that of the impact factor vector.

The measurement equations are given by (cf.(5))

$$\begin{pmatrix} \hat{P}_{f_i,1}^{Neighbour}(t) \\ M \\ \hat{P}_{f_i,m}^{Neighbour}(t) \\ M \\ \hat{P}_{f_i,C}^{Neighbour}(t) \end{pmatrix} = \begin{pmatrix} \varphi_1^T(P_{f_i,1}^{Own}(t), \ldots, P_{f_i,C}^{Own}(t)) \\ M \\ \varphi_m^T(P_{f_i,1}^{Own}(t), \ldots, P_{f_i,C}^{Own}(t)) \\ M \\ \varphi_C^T(P_{f_i,1}^{Own}(t), \ldots, P_{f_i,C}^{Own}(t)) \end{pmatrix} k_{f_i} + \begin{pmatrix} e_{f_i,1}^{Neighbour}(t) \\ M \\ e_{f_i,m}^{Neighbour}(t) \\ M \\ e_{f_i,C}^{Neighbour}(t) \end{pmatrix}, \quad (15)$$

which is abbreviated as $$\hat{P}_{f_i}^{Neighbour}(t) = \Phi(t)k_{f_i}(t) + e_{f_i}^{Neighbour}(t) \quad (16)$$

$$R_2(t) = \quad (17)$$

$$E\left[e_{f_i}^{Neighbour}(t)\left(e_{f_i}^{Neighbour}(t)\right)^T\right] = \begin{pmatrix} \hat{\sigma}_{P_{f_i,1}^{Neighbour}}^2(t) & & 0 \\ & O & \\ 0 & & \hat{\sigma}_{P_{f_i,C}^{Neighbour}}^2(t) \end{pmatrix}$$

Following the same procedure as for equations (10) and (12), the above equations (13)-(17) then results in the Kalman filter $$K_f(t) = P(t|t-1)\Phi^T(t)(\Phi(t)P(t|t-T_{Min})\Phi^T(t)+R_2(t))^{-1}$$

$$\hat{x}(t|t) = \hat{x}(t|t-1) + K_f(t)(y(t) - \Phi(t)\hat{x}(t|t-1))$$

$$P(t|t) = P(t|t-1) - K_f(t)\Phi(t)P(t|t-1)$$

$$\hat{x}(t+1|t) = x(t|t)$$

$$P(t+1|t) = P(t|t) + R_1. \quad (18)$$

Here, $\hat{x}(t|t) = \hat{k}_{f_i}(t|t)$ is the state estimate of the Kalman filter, whereas $P(t|t)$ is the corresponding state covatriance matrix expressing the estimation error. Finally, $K_f(t)$ is the so called Kalman gain matrix, with which the state update is performed recursively (cf. T. Söderström, *Discrete-Time Stochastic Systems-Estimation and Control*. Hemel Hempstead, UK: Prentice Hall, 1994. for details on Kalman filtering).

Figure 3:
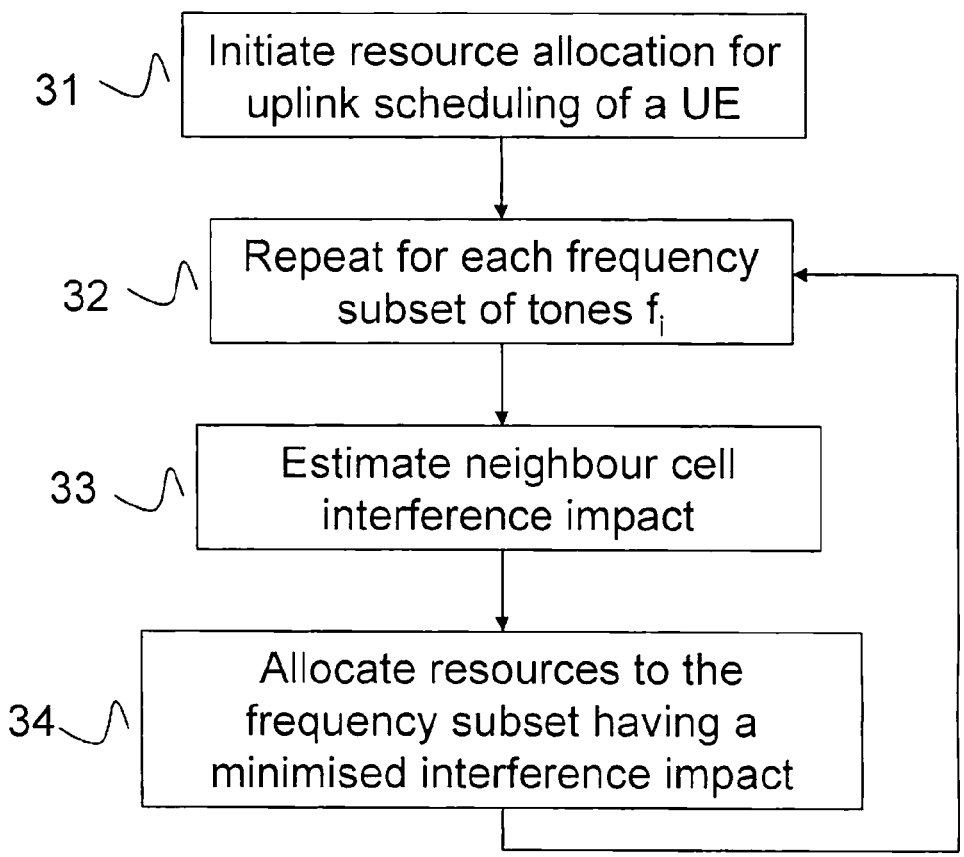
FIG. 3 illustrates a flowchart for performing a resource scheduling applying said impact values.
Figure 4:
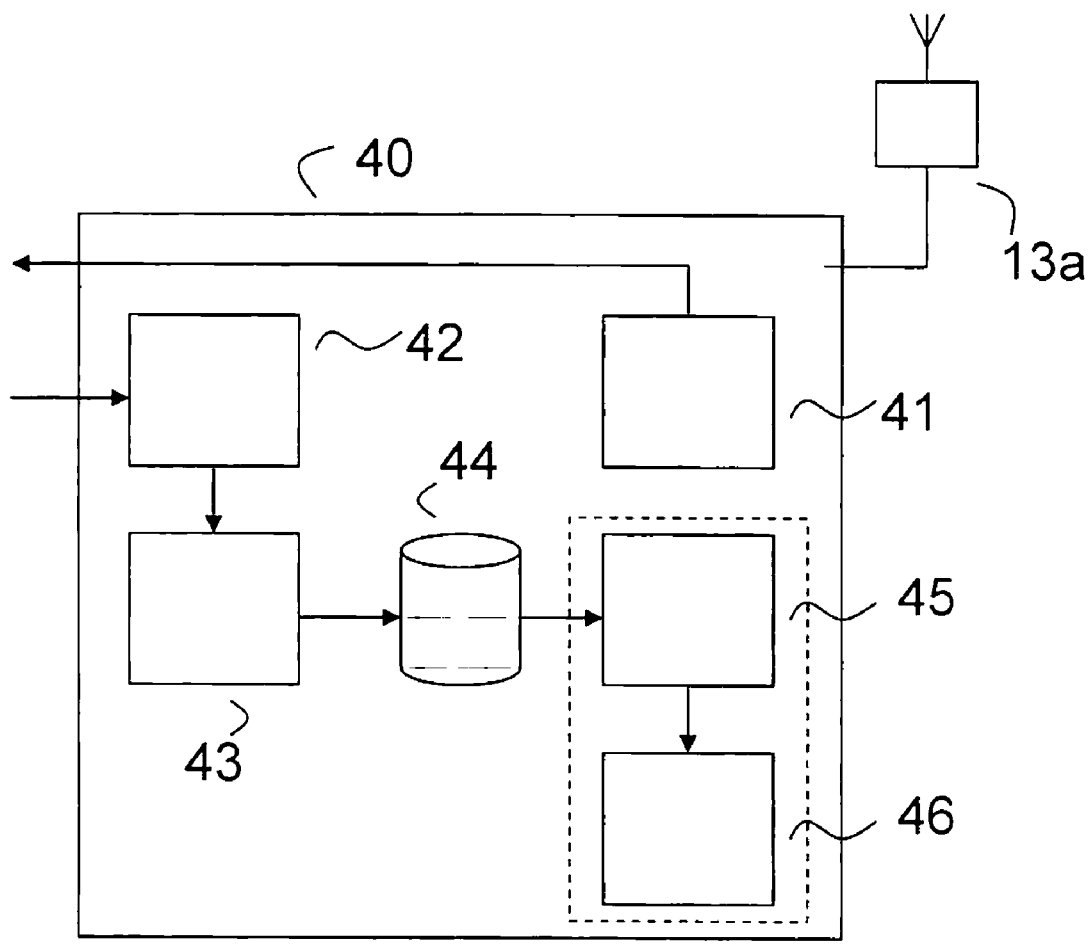
FIG. 4 illustrates an arrangement adapted to perform the methods according to embodiments of the present invention.

As illustrated in the flowchart of FIG. 3, after having calculated a vector of impact values for each frequency subset of tones, the neighbour cell interference impact in response to a resource allocation 31, e.g. caused by an uplink transmission of a UE in said cell, on the neighbouring impacted cells can be estimated 33, for each subset of tones 32, from the sum of the reported total estimated own cell power of said neighbouring cells weighted with the pre-calculated impact value that is specific for the impacting cell and each corresponding impacted cell and the tentatively scheduled cell power due to said US transmission. Thus, the interference impact of tentative scheduling decisions can be evaluated beforehand from a combination of the impact factor with the tentatively additionally scheduled cell power. Hence the scheduler may search for a best overall scheduling of resources, accounting for the impact of all tentative scheduling decisions. Thus, resources, e.g. for a UE transmission, are preferably allocated 34 to the frequency subset having a minimised interference impact on said neighbouring cells.

Arrangements according to the embodiments of the present invention can be implemented in a unit 40 connected to or integrated in a base transceiver station 13a of a communication system, whereby this base transceiver station 13a serves a cell 11a that is part of a cluster 10 of neighbouring cells. Said unit 40 comprises a first processor adapted to provide information on at least the total estimated neighbour cell interference power $P_{f_i}^{Neighbour}$ and the own cell power $P_{f_i}^{Own}$ for frequency subsets of tones $f_i$ for signalling to neighbouring cells 11b-11f in said cluster 10 and a second processor 42 adapted to provide such information as received from said neighbouring cells 11b-11f for further processing by a third processor 43 adapted to estimate for each frequency subset of tones $f_i$ the vector of impact values $k_{f_i}$ from at least said received information, whereby each impact value describes the interference impact of transmissions in said first cell 11a on a respective other cell in said cluster. The impact vector can, e.g., be stored in a storage unit 44 to be used for estimating the neighbour cell interference.

For resource scheduling on frequency subsets of tones $f_i$, e.g. for a UE transmission 14, the unit 40 applies an estimator 45 adapted to estimate the neighbour cell interference impact of a resource allocation in one of the frequency subsets of tones $f_i$ in said first cell 11a from the sum of the reported total estimated own cell power of said neighbouring cells 11b-11f weighted with the pre-calculated and stored impact value that is specific for the impacting cell and each corresponding impacted cell. Then, a scheduler can schedule the UE transmission 14 to the frequency subset having a minimised interference impact on said neighbouring cells.

The invention claimed is:

1. A method in a unit connected to or integrated in a base transceiver station of a communication system, said base transceiver station serving a first cell being part of a cluster of neighbouring cells served by base transceiver stations, said method for determining impact values for transmissions in said first cell on the interference in neighbouring cells of said cluster, and said method comprising:

signalling information on at least the total estimated neighbour cell interference power $P_{f_i}^{Neighbour}$ and the own cell power $P_{f_i}^{Own}$ for frequency subsets of tones $f_i$ to neighbouring cells in said cluster; and calculating for each frequency subset of tones $f_i$ a vector of impact values $k_{f_i}$ from at least a regression vector comprising received values of the own cell powers $P_{f_i}^{Own}$ of neighbouring cells in said cluster and from received values of said estimated neighbour cell interference power $P_{f_i}^{Neighbour}$, whereby each impact value describes the interference impact of transmissions in said first cell on a respective other cell in said cluster.

2. The method according to claim 1, whereby the signalled information includes a variance indication for one or more of the signalled power measures.

3. The method according to claim 2, whereby the signalled information includes a measure of the thermal noise power floor.

4. The method according to claim 2, whereby one or more of the signalled power measures are expressed relative to the variance or thermal noise power floor.

5. The method according to claim 1, whereby the vector of impact values is calculated by $\hat{k}_{f_i} = (\Phi_{f_i}^T \Phi_{f_i})^{-1} \Phi_{f_i}^T P_{f_i}^{Neighbour}$, where $\Phi_{f_i}$ denotes a vector of the transposed regression vectors.

6. The method according to claim 5, whereby the calculation of the vector of impact values implies a weighting of the vector $\Phi_{f_i}$ of transposed regression vectors by a weighting matrix R denoting the statistical expectation of the estimation error of the estimated neighbour cell interference power $P_{f_i}^{Neighbour}$.

7. The method according to claim 1, whereby the vector of impact values $k_{f_i}(t)$ is derived as the state estimate of a Kalman filter performing the steps of:

employing a dynamic model of the variation of said impact values; and adjusting said state estimate according to an estimated Kalman gain based on variance parameters describing accuracy and size of the measurement error of said dynamic model.

8. A method in a unit connected to or integrated in a base transceiver station of a communication system, said base transceiver station serving a first cell being part of a cluster of neighbouring cells served by base transceiver stations, said method for estimating an interference impact on the other cells of said cluster when performing a resource scheduling on one of a plurality of frequency subset of tones f.sub.i for a user equipment (UE) transmission, and said method comprising:

estimating the neighbour cell interference impact of a resource allocation for each of the plurality of frequency subset of tones f.sub.i in said first cell from the sum of the reported total estimated own cell power of said neighbouring cells weighted with a pre-calculated impact value specific for an impacting cell and each corresponding impacted cell and the tentatively scheduled power due to said UE transmission; and allocating resources for the UE transmission to the frequency subset having a minimised interference impact on said neighbouring cells.

9. The method according to claim 8, wherein said impact values are calculated by:

signalling information on at least the total estimated neighbour cell interference power $P_{f_i}^{Neighbour}$ and the own cell power $P_{f_i}^{Own}$ for frequency subsets of tones $f_i$ to neighbouring cells in said cluster; and calculating for each frequency subset of tones $f_i$ a vector of impact values $k_{f_i}$ from at least a regression vector comprising received values of the own cell powers $P_{f_i}^{Own}$ of neighbouring cells in said cluster and from received values of said estimated neighbour cell interference power $P_{f_i}^{Neighbour}$, whereby each impact value describes the interference impact of transmissions in said first cell on a respective other cell in said cluster.

10. A unit connected to or integrated in a base transceiver station of a communication system, said base transceiver station serving a first cell being part of a cluster of neighbouring cells served by radio base stations, said unit adapted for determining impact values for transmissions in said first cell on the interference in neighbouring cells of said cluster, and said unit comprising:

a first processor adapted to provide information on at least the total estimated neighbour cell interference power $P_{f_i}^{Neighbour}$ and the own cell power $P_{f_i}^{Own}$ for frequency subsets of tones $f_i$ for signalling to neighbouring cells in said cluster;

a second processor adapted to provide information on at least the total estimated neighbour cell interference power $P_{f_i}^{Neighbour}$ and the own cell power $P_{f_i}^{Own}$ for frequency subsets of tones $f_i$ received from neighbouring cells in said cluster; and a third processor adapted to estimate for each frequency subset of tones $f_i$ a vector of impact values $k_{f_i}$ from at least a regression vector comprising said received values of the own cell powers $P_{f_i}^{Own}$ of neighbouring cells in said cluster and from said received values of said estimated neighbour cell interference power $P_{f_i}^{Neighbour}$, whereby each impact value describes the interference impact of transmissions in said first cell on a respective other cell in said cluster.

11. A unit connected to or integrated in a base transceiver station of a communication system, said base transceiver station serving a first cell being part of a cluster of neighbouring cells served by base transceiver stations, said unit adapted for estimating an interference impact on the other cells of said cluster when performing a resource scheduling on a plurality of frequency subsets of tones f.sub.i for a user equipment (UE) transmission, said unit comprising:

an estimator adapted to estimate the neighbour cell interference impact of a resource allocation in one of the plurality of frequency subsets of tones f.sub.i in said first cell from the sum of the reported total estimated own cell power of said neighbouring cells weighted with a pre-calculated impact value specific for the impacting cell and each corresponding impacted cell and the tentatively scheduled cell power due to said UE transmission; and a scheduler for scheduling the UE transmission to the frequency subset having a minimised interference impact on said neighbouring cells.

* * * * *